(12) United States Patent
Barroso

(10) Patent No.: US 6,389,003 B1
(45) Date of Patent: May 14, 2002

(54) METHOD FOR DECREASING FALSE POSITIVES IN FRAME SYNCHRONIZATION OF CODE DIVISION MULTIPLE ACCESS

(75) Inventor: Christopher Burke Barroso, New York, NY (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/448,354

(22) Filed: Nov. 23, 1999

(51) Int. Cl.$^7$ ................................................ H04J 13/00
(52) U.S. Cl. ...................................... 370/342; 370/503
(58) Field of Search ................................ 370/320, 335, 370/342, 503

(56) References Cited

U.S. PATENT DOCUMENTS 5,444,743 A    8/1995  Scarpa ....................... 375/368
5,675,591 A  * 10/1997  Salzwedel ................... 714/807

OTHER PUBLICATIONS

William J. Bielawski III, et al., 5ESS® Packet Switched Network with ATM Interconnect for CDMA, 1997, pp. 203–212, Bell Labs Technical Journal, Spring 1997.

Richard P. Ejzak, et al., Bali: A Solution for High–Speed CDMA Data, 1997, pp. 134–151, Bell Labs Technical Journal, Summer 1997.

* cited by examiner

Primary Examiner—Douglas Olms
Assistant Examiner—Ken Vanderpuye
(74) Attorney, Agent, or Firm—Brown Pinnisi & Michaels PC

(57) ABSTRACT

A solution to a problem of false positives in frame synchronization in telecommunication systems involves generating a separate channel estimate based only on the non-SW (all −1) bits of a pilot sequence. This non-SW channel estimate is used to correct received pilot SW symbols. These specially corrected symbols are rake combined separately from other symbols. The result is used exclusively for the frame synchronization detector. Normal channel estimate calculations and rake combining proceeds as usual. This method of frame synchronization only refers to SW bit matches. False positives are decreased using the invention.

2 Claims, 1 Drawing Sheet

METHOD FOR DECREASING FALSE POSITIVES IN FRAME SYNCHRONIZATION OF CODE DIVISION MULTIPLE ACCESS

FIELD OF THE INVENTION

The invention pertains to the field of telecommunication systems. More particularly, the invention pertains to the detection of false positives in frame synchronization of a Code Division Multiple Access (CDMA) telecommunications system.

BACKGROUND OF THE INVENTION

Code Division Multiple Access (CDMA) is currently being used by the majority of communication carriers in the United States to provide improved digital wireless telephone service to their customers.

CDMA is the term applied to a family of digital communication techniques called "spread spectrum" that have been used in military applications for many years. Spread spectrum uses noise-like carrier waves and wider bandwidths than those required for simple point-to-point communication at the same data rate. The two original driving motivations to develop spread spectrum technology were to prevent jamming of communications (anti-jam, or AJ), and to hide the fact that communication was taking place, often called low probability of intercept (LPI). By spreading the communications signals over a wider bandwidth, the signal is both decreased to an extent that it is not detected by unfriendly receivers, and spread out enough so that the signal can not be jammed.

CDMA changes a basic device for a system from a predominately analog device to a predominately digital device. CDMA receivers do not eliminate analog processing entirely, but they separate communication channels by means of a modulation that is applied and removed digitally, not on the basis of frequency. Multiple users occupy the same frequency band. This universal frequency reuse is essential to the very high spectral efficiency that is the cornerstone of CDMA.

CDMA allows the transmission of multiple messages through a common channel. In multiple access, many users utilize the same communications path. All users occupy the same channel bandwidth and transmit simultaneously. But, each user has a unique wide-bandwidth code, or spreading sequence. The properties of this unique spreading sequence allows each receiver, when correctly synchronized to the spreading sequence of the user, to receive the signal of that user and block out the signals of the other users sufficiently so that interference is at a tolerable level.

In the transmission of digital data between two units in a telecommunication system, bits of data are commonly grouped in bytes, bytes are grouped in segments, segments are grouped in blocks called frames and frames are transmitted in a window of data. The beginning and end of each frame needs to be clearly identifiable. For reliable communication, the unit receiving the data must be synchronized with the unit transmitting the data.

Synchronization occurs at different levels. Bit synchronization occurs when the receiving unit correctly recognizes the boundaries between bits of received data. Frame synchronization occurs when the receiving unit correctly recognizes the frame boundaries in the received data. Synchronization similarly occurs for bytes and for segments.

Within a CDMA base station air interface, frame synchronization detection and validation is an essential function. Frame synchronization is used to detect an initial channel connection as well as a continuous run-time validation of channel connectivity. Its current status is transferred periodically along with channel receive data packets. The active synchronization condition is used to enable closed-loop power control, to enable a reduced searcher window (for shorter search cycles) and to assist in identifying valid data flow.

There are two different types of frame synchronization. First, the "Internal Frame Synchronization" (IFS). This synchronization status is determined solely from checks against the known received pilot block symbol pattern. Active IFS status is used to enable closed-loop power control. The second type of frame synchronization is referred to as "data validity frame synchronization" (DVFS). This type synchronization status is used to indicate to the system whether or not the receive signal appears to have been lost. That is, inactive DVFS indicates that the receiver is no longer tracking the signal. The general algorithm to determine DVFS status uses a combination of the IFS status and the CRC (cyclic redundancy code) check result on each receive data packet.

Description of the IFS algorithm depends on understanding the received pilot block symbol pattern within the receive data frame structure. The typical data frame structure is a 10 mS packet consisting of usually 16 time slots. Within each time slot, several symbols are devoted to the pilot block sub-channel. The pilot block consists of a known sequence of symbols. The pilot symbol sequence varies depending on the time slot number, but the sequence is identical for each frame

TABLE 1

| | Pilot Symbol Pattern | | | |
|---|---|---|---|---|
| Symbol # | 0 | 1 | 2 | 3 |
| Slot #1 | 11 | 11 | 11 | 11 |
| 2 | 11 | 11 | 11 | 01 |
| 3 | 11 | 01 | 11 | 01 |
| 4 | 11 | 10 | 11 | 01 |
| 5 | 11 | 10 | 11 | 11 |
| 6 | 11 | 10 | 11 | 11 |
| 7 | 11 | 01 | 11 | 00 |
| 8 | 11 | 10 | 11 | 01 |
| 9 | 11 | 11 | 11 | 00 |
| 10 | 11 | 01 | 11 | 01 |
| 11 | 11 | 11 | 11 | 10 |
| 12 | 11 | 01 | 11 | 01 |
| 13 | 11 | 00 | 11 | 01 |
| 14 | 11 | 10 | 11 | 00 |
| 15 | 11 | 01 | 11 | 00 |
| 16 | 11 | 00 | 11 | 00 |

Note that the example pattern of Table 1 is for four pilot symbols per time slot and QPSK modulation so that there are two bits per symbol. Columns (Symbol #) 1 and 3 are referred to as the synchronization word (SW) symbols. The even numbered columns are framing symbols. Note that these are typically all ones. The pilot sequence is always known to baseband processing equipment. Channel timing, determined as a normal part of CDMA receivers provides continuous knowledge of the current received time slot and symbol numbers.

The common IFS algorithm compares the received SW bits to the expected value. Parameters $N_b$ and $S_R$ are defined for the algorithm. Internal Frame Synchronization is determined to be achieved (active) when $S_R$ or more consecutive frames are received containing $N_b$ or fewer SW bits unmatched. The $S_R$ and $N_b$ parameters are usually determined through simulation or experimentation. Default values are 2 frames and 10 bits, respectively. In this example, the bit compare test for every frame is a check that 10 or fewer bits mismatch out of a possible 64 bits (2 bits/symbol×2 SW symbols/time slot×16 time slots per frame).

Continuing with this example, making several reasonable assumptions, the probability of a false positive indication (frame synchronization indicated when not actually true) is easily calculated. Assume that there is no valid signal present at the receiver; however, there is random noise. When noise is present with sufficient power, or as random fluctuations provide, the chip correlator complex multiply and summation may result in noisy symbol data which is roughly Gaussian with zero mean. However, each symbol is statistically independent.

The probability of a false positive result is then the cumulative probability of a binomial distribution achieving 10 hits in 64 trials:

$$Pf = 2^{-64} \sum_{k=0}^{10} \binom{64}{k} \approx 10^{-8}$$

The result is a false alarm probability of roughly $10^{-8}$. If this number of false positives is truly correct, it should not create a problem.

However, a more thorough analysis of channel processing does indicate a problem with the frame synchronization calculation. Normal channel processing to produce valid symbol data consists of the following basic steps.

First, signal chip correlation is received to give symbols, channel estimation, symbol data channel correction and rake combining. Chip correlation de-spreads the received signal. Channel estimation uses a known symbol sequence within the pilot block in order to determine phase and magnitude changes the channel imparts. Rake combining enhances the receiver by making the symbol output a weighted average of up to eight multipath components according to each individual multipath channel estimate. These calculations, for a single rake finger only, may be written using the field of complex real numbers to represent the in-phase (I) and quadrature phase (Q) signal components of each symbol as real and imaginary parts, respectively.

$S = Ae^{ja}$ Transmitted pilot signal model. (1)

$H = Be^{jb}$ Channel transfer function model. (2)

$Y = ABe^{j(a+b)}$ Received signal. (3)

$P = e^{ja}$ Pilot block signal model. (4)

$M = YP^* = ABe^{jb}$ Channel estimate. (5)

$D = YM^* = (AB)^2 e^{ja}$ Single rake finger resulted symbol data. (6)

These calculations are detailed for the symbols of a single pilot block of one time slot. Let the received signal symbol (I, Q) components be written as $Y=(A_0, A_1), (S_0, S_1), (A_2, A_3), (S_2, S_3)$ with $A_x$ indicating the (−1, −1) pilot block symbols and the $S_x$ representing the received SW bits. In the same manner, let the known pilot symbol pattern be indicated by $P=(P_0, P_1), (P_2, P_3), (P_4, P_5), (P_6, P_7)$. Note that $P_0$, $P_1$, $P_4$ and $P_5$ are always −1.

Next, the channel estimate is calculated with complex multiplication. Recall that $(I+jQ)(I+jq)^*=(Ii+Qq)+j(Qi-Iq)$.

$$M = (-A_0 - A_1) + j(-A_1 + A_0) +$$
$$(S_0 P_2 + S_1 P_3) + j(S_1 P_2 - S_0 P_3) +$$
$$(-A_2 - A_3) + j(-A_3 + A_2) +$$
$$(S_2 P_6 + S_3 P_7) + j(S_3 P_6 - S_2 P_7)$$

$$M = \{-(A_0 + A_1 + A_2 + A_3) + S_0 P_2 + S_1 P_3 + S_2 P_6 + S_3 P_7\} +$$
$$j\{(A_0 - A_1 + A_2 - A_3) + -S_0 P_2 + S_1 P_2 - S_2 P_7 + S_3 P_6\}$$

Only the channel estimate symbol correction for SW bits $S_0$ and $S_1$ are considered here for the channel correction step.

$$D = (S_0' + jS_1') = (S_0 M_i + S_1 M_q) + j(S_1 M_i - S_0 M_q)$$

$$D = \{-S_0(A_0 + A_1 + A_2 + A_3) + S_0^2 P_2 + S_0 S_1 P_3 + S_0 S_2 P_6 + S_0 S_3 P_7 +$$
$$S_1(A_0 - A_1 + A_2 - A_3) - S_0^2 P_3 + S_0 S_1 P_2 - S_0 S_2 P_7 + S_0 S_3 P_6\} +$$
$$j\{-S_1(A_0 + A_1 + A_2 + A_3) + S_0 P_2 + S_1^2 P_3 + S_1 S_2 P_6 + S_1 S_3 P_7 -$$
$$S_0(A_0 - A_1 + A_2 - A_3) + S_0 S_1 P_2 - S_1^2 P_2 + S_1 S_2 P_7 - S_1 S_3 P_6\}$$

The calculations are continued in order to show the expected outcome of normal channel processing performed on random received data. For this purpose, it is desired to find the statistical expected value of the processed SW symbol ($S_0'$, $S_1'$). Since the $P_x$ elements are known, these values are merely constants +1 or −1. The received SW bits are assumed to be random and statistically independent. This means that they are also uncorrelated so that $E\{S_a, S_b\}=0$ for all a and b where a is not equal to b.

$$E\{D\} = E\{S_0' + jS_1'\} = P_2 E\{S_0^2\} - P_3 E\{S_0^2\} + j[P_3 E\{S_1^2\} - P_2 E\{S_1^2\}]$$
$$= (P_2 - P_3)[E\{S_0^2\} - jE\{S_1^2\}] \text{ BIASED}$$

For the typical pilot block sequence, 18 out of 32 SW symbols have $P_2$ not equal $P_3$. The $E\{S_x^2\}$ are always greater than or equal to zero, and have significant values whenever noise power appears out of the correlator. Notice that this result does not show the desired zero expected value.

Next, the impact of the unbiased SW bit processing is determined. The important consideration for frame synchronization detection is the probability of a false positive indication from the detector; that is, the probability that frame synchronization is indicated to be true when noise is received. Since magnitude is not a consideration for the detector, the algorithm simply compares the sign of the calculated $S_x$ with the expected $P_x$. Mismatched signs are counted towards the $N_b$ or fewer bits (per frame) synchronization requirement. $P_{Fx}$ represents the probability of a false match occurring on SW bit $S_x$.

For $S_0$, $P_{F0}=Prob\{sgn(P_2)=sgn(S_0')\}=Prob\{sgn(P_2)=sgn(P_2-P_3)|(P_2!=P_3)\}=1$ Similarly for $S_1$, $P_{F1}=Prob\{sgn(P_3)=sgn(S_1')\}=Prob\{Sgn(P_3)=sgn(P_3-P_2)|(P_2!=P_3)\}=1$ This calculation is performed for all SW bits. These results indicate that the statistically biased processing of the detector is always in the direction of a false positive outcome. The bias becomes significant for SW symbols in quadrants 2 and 4 (which are the slight majority), while correlator output has greater than zero variance.

Test results show that the frame synchronization detector frequently gives a false positive result even when small levels of noise are present. The rate of this occurrence is far greater than the presumed $10^{-8}$ rate.

These false IFS active indications very significantly disturb system performance. This is especially true for channel operation such as packet mode where rapid and verifiable data flow stop/start is critical to efficient throughput. Also, for channel types in which CRC coverage is lower. For example, an 8 bit CRC means that for all operation with false IFS indication, one out of 256 frames will be indicated good data. This places a strain on higher layer system software to deal with random data marked good. False IFS indications will also activate high-speed closed-loop power control with erroneous power control commands. This adds significantly extra noise to each system sector, which reduces system capacity.

It is apparent that channel processing and frame synchronization, as currently implemented, are flawed in terms of frequently producing a false positive. Aside from the detailed analysis above, a simple argument can be made for the problem. A channel detector is used which first assumes a known pattern is present on the channel in order to determine a channel estimate which is then used to correct the channel data. The processed data is then tested for the same known pattern. This is a circular reasoning algorithm which predetermines a positive outcome. A solution is needed to decrease the number of false positives present in the current method of frame synchronization.

SUMMARY OF THE INVENTION

Briefly stated, a solution to a problem of false positives in frame synchronization in telecommunication systems involves generating a separate channel estimate based only on the non-SW (all −1) bits of a pilot sequence. This non-SW channel estimate is used to correct received pilot SW symbols. These specially corrected symbols are rake combined separately from other symbols. The result is used exclusively for the frame synchronization detector. Normal channel estimate calculations and rake combining proceeds as usual. This method of frame synchronization only refers to SW bit matches. False positives are decreased using the invention.

DESCRIPTION OF THE PREFERRED EMBODIMENT

Figure 1:
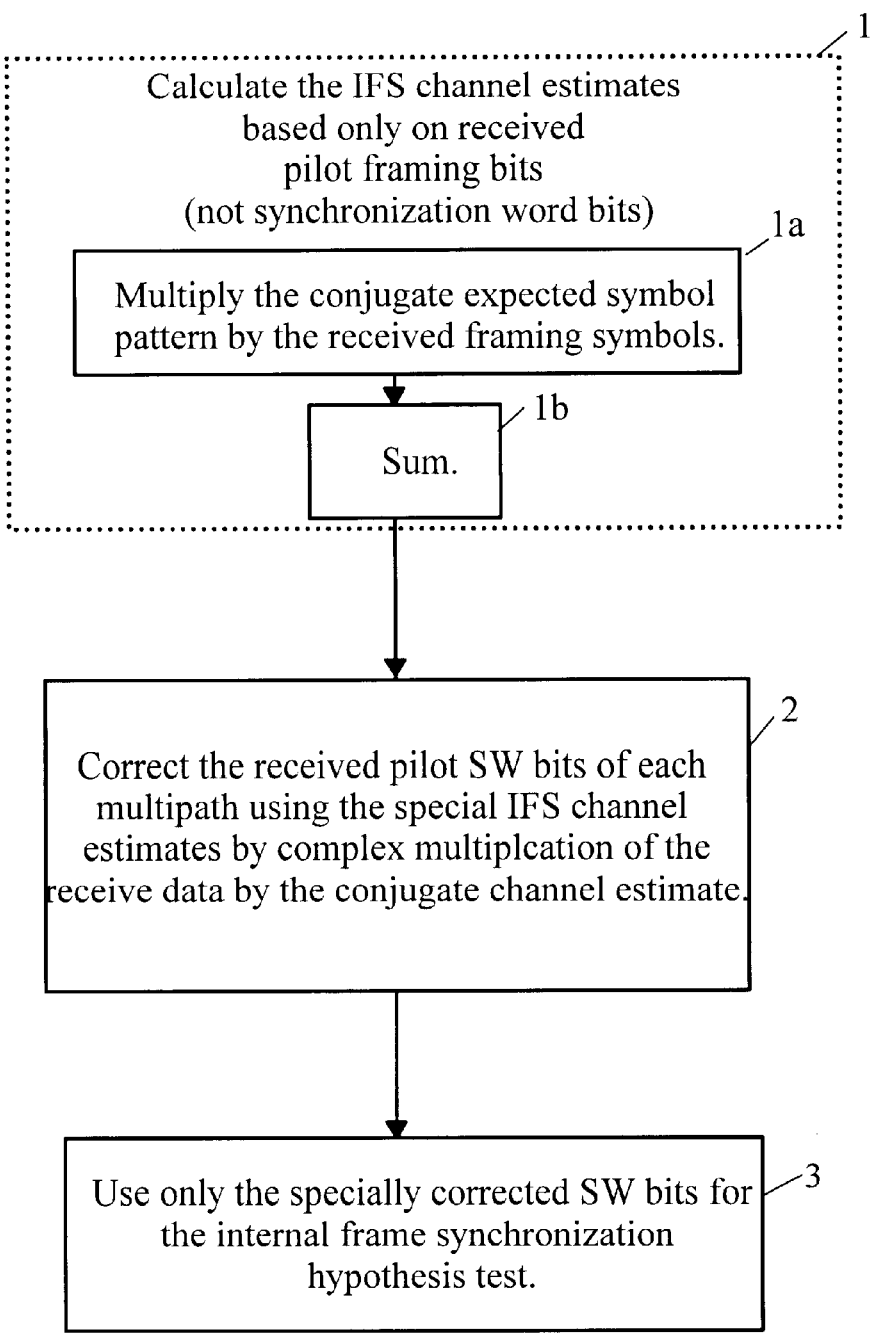
FIG. 1 shows a flowchart of the method of the current invention.

In modern CDMA receivers, independent channel estimates are extremely important for each air interface received multipath. This is because each multipath typically has completely different channel propagation parameters from any other multipath. Each multipath's propagation parameters are therefore estimated with a separate channel estimator. Channel estimators use the received pilot symbols to continuously model the channel propagation parameters for each received multipath. Each channel estimate is then used to correct the receive multipath signal; that is, to compensate each multipath according to the channel disturbance the multipath received. This operation is a standard part of CDMA receivers. The derivation above shows however that, only for the case of frame synchronization hypothesis testing, this standard operation results in erroneous operation; heavily biases positive results. The reason for this it was shown, is that the same received pilot symbol bits are first assumed known and then used for channel estimation, channel corrected according to that assumption, and then hypothesis tested for accuracy against that known symbol assumed pattern. Weak results therefore follow a predisposition to fall towards the assumed result.

The solution to this problem therefore is to remove the circular reasoning for frame synchronization hypothesis testing. Since only the SW bits are used for the IFS hypothesis test, the key to remove bias from the test is to calculate separate channel estimates (for each multipath) which are not based on the pilot SW bits, and therefore do not assume any particular SW bit pattern. The framing bits (all ones) of the pilot block are the only bits used for the special IFS channel estimate. The IFS channel estimate is then used to correct the multipath received SW bits, which may then be hypothesis tested to determine internal frame synchronization. The new procedure for valid IFS calculation is as follows:

(1) Calculate the special IFS channel estimates based only on received pilot framing bits (not SW bits). This is simply a matter of (1a) complex multiplying the conjugate expected symbol pattern ($e^{j\pi/2}$) by the received framing symbols and (1b) summing the result.

(2) Use the special IFS channel estimates to correct the received pilot SW bits of each multipath. As indicated above, channel correction is performed identically for both IFS hypothesis testing and normal data correction—the only difference being the channel estimate used. Maximal ratio combining dictates this operation to be simply complex multiplication of the receive data by the conjugate channel estimate.

(3) Use only these specially corrected SW bits for the internal frame synchronization hypothesis test (count the mismatches to the expected receive sequence).

With the implementation of these steps, the originally expected frame synchronization results, probability of false positive detection in the range of $10^{-8}$ is achieved.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

What is claimed is:

1. A method for decreasing false positives during the hypothesis test of an internal frame synchronization of a received multipath signal in at least one channel in a CDMA telecommunications system having channels with pilot blocks, each pilot block comprising framing symbols and synchronization word symbols, comprising the steps of:

a) calculating a channel estimate based only on the framing symbols of the received pilot blocks in a multipath signal;

b) correcting the synchronization word symbols of the received pilot blocks in the multipath signal by complex multiplication of the receive data by the channel estimate calculated in step (a); and c) using only the corrected synchronization word symbols from step (b) for the internal frame synchronization hypothesis test;

wherein an expected frame synchronization results from steps (a) through (c), thereby decreasing the number of false positives.

2. The method of claim 1, in which the calculating of step (a) comprises the substeps of:

i) complex multiplying the conjugate expected symbol pattern ($e^{j\pi/2}$) by the received framing symbols; and ii) summing the result.

* * * * *